(12) United States Patent
Silveira et al.

(10) Patent No.: US 7,187,819 B1
(45) Date of Patent: Mar. 6, 2007

(54) OPTICAL POWER DISTRIBUTION MANAGEMENT AND APPARATUS

(75) Inventors: Paulo E. X. Silveira, Boulder, CO (US); Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 258 days.

(21) Appl. No.: 10/749,427

(22) Filed: Dec. 31, 2003

(51) Int. Cl.
G02B 6/26 (2006.01)
H04B 10/08 (2006.01)
G02B 6/00 (2006.01)
(52) U.S. Cl. .................. 385/16; 385/24; 398/10
(58) Field of Classification Search .......... 385/48; 398/15
See application file for complete search history.

(56) References Cited

U.S. PATENT DOCUMENTS

| | | | |
|---|---|---|---|
| 4,449,785 A | 5/1984 | Huignard et al. ......... 350/3.61 |
| 4,566,087 A | 1/1986 | Kraft ........................ 369/34 |
| 5,001,667 A | 3/1991 | Antonov et al. ............ 365/127 |
| 5,208,792 A | 5/1993 | Imanaka .................. 369/44.38 |
| 5,661,287 A | 8/1997 | Schaefer et al. ............ 253/383 |
| 6,194,707 B1* | 2/2001 | Yang ..................... 250/227.15 |
| 6,314,071 B1 | 11/2001 | Alon et al. .............. 369/53.37 |
| 6,542,954 B1 | 4/2003 | Aruga ....................... 710/316 |
| 6,614,751 B1 | 9/2003 | Katao .......................... 369/291 |
| 6,721,502 B1* | 4/2004 | Al-Salameh et al. .......... 398/3 |
| 6,897,424 B2* | 5/2005 | Suzuki ....................... 250/205 |
| 2002/0163872 A1 | 11/2002 | Roh et al. ................... 369/103 |
| 2003/0009700 A1 | 1/2003 | Emberty et al. ............ 713/300 |
| 2004/0047628 A1* | 3/2004 | Passier et al. ................ 398/15 |

* cited by examiner

*Primary Examiner*—Sung Pak
(74) *Attorney, Agent, or Firm*—Yee & Associates, P.C.

(57) ABSTRACT

A method, apparatus and computer program are disclosed for managing the distribution of optical power to a plurality of optical data devices. The devices can be data storage drives, data replicators, fast optical search devices, or other components that use optical or laser power for their operation. A power management system provides the increased flexibility of monitoring and redirecting optical power (e.g., to provide higher or lower power on demand), which increases the fault-tolerance and performance (e.g., through higher data transfer rates) of a data management system.

15 Claims, 5 Drawing Sheets

OPTICAL POWER DISTRIBUTION MANAGEMENT AND APPARATUS

BACKGROUND OF THE INVENTION

1. Field of the Invention

The present invention relates generally to an optical illuminator system, and in particular, to a distribution management and method for delivering optical power to a plurality of optical data devices.

2. Background of the Invention

Optical power management systems typically require the use of at least one optical power source (e.g., a CW laser, pulsed laser, laser diode, light emitting diode, etc.) for recording, retrieving and manipulating data. Small, relatively low power, low cost solid-state laser diodes with modest optical coherence are the predominant source of optical illumination in existing optical data storage systems. However, the need for shorter wavelength sources to enable greater data storage densities, the need for more powerful sources to enable increased data transfer rates, and the need for sources with longer coherence lengths for holographic data storage and other coherent applications, give rise to the problem of accommodating physically larger, higher power dissipating sources within the limited form factor of an optical device. Further compounding the problem are budgetary constraints that place a limit on the optical source cost per optical data device and the need for a highly reliable source.

Lower power, lower quality sources (i.e., sources with higher relative intensity noise, lower coherence length, higher wavelength drift, higher temperature sensitivity, limited wavelength tunability, etc.) limit the performance of optical storage drives and other optical data devices that use optical illumination (e.g., optical data replicators, fast optical search devices, etc.). This performance limitation is a consequence of the trade-off between the total energy required to achieve a desired physical and/or chemical effect while manipulating (e.g., recording, retrieving, processing or copying) data over a given illuminated area, and the time it takes to deliver the required energy. As such, this performance limitation represents a limitation on the optical data device parameters, including data density, capacity, transfer rates, search rates, error rates, integrity, reliability and lifetime.

Therefore, it would be desirable to have a system and method for efficiently utilizing a superior laser source despite its larger physical size, increased power and/or cooling demands and greater cost. It would be even more advantageous if such a system and method were capable of automatically detecting and correcting for optical power defects and failures, and optimizing the lifetime of laser sources—all with minimum user intervention. Finally, such a system and method could provide optical power on demand, boosting the performance of optical data devices that received higher performance priority.

SUMMARY OF THE INVENTION

The present invention provides a method, apparatus and computer program for managing the distribution of optical power from a plurality of (1 to M), high quality, high power optical sources, to a plurality of (1 to N) optical data devices. The optical data devices can be data storage drives, data search engines, data replicators, or other components that use optical power for their operation. Also, the present invention provides a data management system with the increased flexibility of monitoring and redirecting optical power on demand, which increases the fault-tolerance and performance (e.g., through higher data transfer rates) of the data management system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
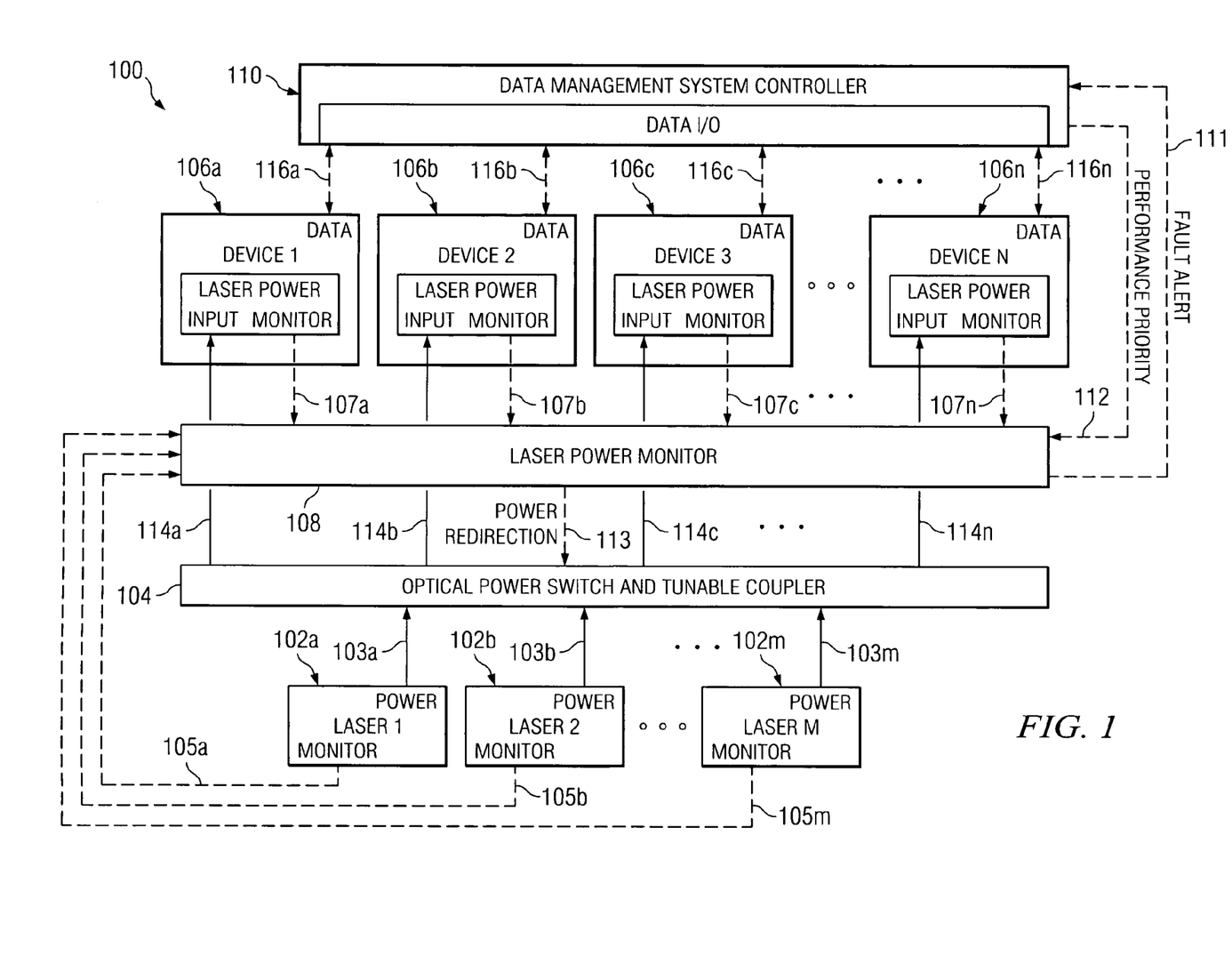
FIG. 1 depicts a block diagram illustrating a fault-tolerant, optical power distribution and management system in accordance with a preferred embodiment of the present invention.

With reference now to the figures, and in particular with reference to FIG. 1, a block diagram of a fault-tolerant, optical power distribution and management system is illustrated in accordance with a preferred embodiment of the present invention. Exemplary system 100 includes a plurality of optical power sources which, in this case, are laser power sources 102a–102m (e.g., where "m" denotes the final or $m^{th}$ laser power source). Each laser power source 102a–102m includes a power output connection 103a–103m and power monitor output connection 105a–105m. Power output connections 103a–103m are coupled to respective inputs of optical power switch and tunable coupler 104, and power monitor output connections 105a–105m are coupled to respective inputs of laser power monitor 108. Each power output connection 103a–103m couples the output power of the respective laser power source 102a–102m to optical power switch and tunable coupler 104. Each power monitor output connection 105a–105m relays an electronic signal to laser power monitor 108 that is proportional to the intensity of the respective laser power source 102a–102n. Such a signal is derived from the detection of a small sample of the laser power. Connection 113 couples power redirection signals from laser power monitor 108 to optical power switch and tunable coupler 104.

Exemplary system 100 also includes a plurality of optical data devices 106a–106n (where "n" denotes the final or nth optical data device). Power output connections 114a–114n couple the output power of the respective laser power sources 102a–102m from optical power switch and tunable coupler 104 to selected inputs of optical data devices 106a–106n. As described in more detail below, the actual power levels at output power connections 114a–114n, and the selection of inputs to optical data devices 106a–106n are performed by optical power switch and tunable coupler 104, which may select the coupling ratios based on an algorithm, or which may simply use a predetermined coupling ratio.

Power monitor output connections 107a–107n of respective optical data devices 106a–106n are electronically relayed to respective inputs of laser power monitor 108. Each power monitor output connection 107a–107n couples a relatively small percentage of the laser source power received at the respective optical data device 106a–106n to a photodetector that converts the received intensity into an electronic signal which is then transmitted to laser power monitor 108. Data connections 116a–116n transfer data (e.g., storing and retrieving) between optical data devices 106a–106n and respective input/output (I/O) connections of data management system controller 110. Output connection 111 of laser power monitor 108 couples fault alert signals (e.g., if any laser power level errors occur) to an input of data management system controller 110. Output connection 112 of data management system controller 110 couples performance priority signals to an input of laser power monitor 108.

Essentially, laser power sources 102a–102m and optical data devices 106a–106n can be mounted on the same equipment rack, where laser sources 102a–102n, optical data devices 106a–106n, and laser power monitor 108 and optical power switch and tunable coupler 104 modules use a similar form-factor in order to facilitate the field replacement of defective units, the upgrade of existing equipment, and the inclusion of additional equipment (e.g., more laser sources, new optical data devices, etc.). Preferably, more than one each module should be available in order to provide the system with the redundancy required for superior fault-tolerance.

Alternatively, for example, laser power sources 102a–102m and optical data devices 106a–106n can be arbitrarily mounted on different equipment racks, with their respective outputs and inputs coupled together (e.g., via optical power switch and tunable coupler 104) with appropriate optical coupling (e.g., optical fiber coupling), as depicted later in FIG. 6. In a preferred embodiment, the optical fibers conveying optical power, and conducting wires conveying electrical power and electronic signals, can be bundled together in the same cable, thus simplifying the cabling and facilitating the replacement of modules during repairs or upgrades. In any event, the arrangement, configuration and location of laser power sources 102a–102m, optical data devices 106a–106n, optical power switch and tunable coupler 104, laser power monitor 108, and data management system controller 110 in FIG. 1 are presented for purposes of illustration and description, and are not intended to impose an architectural limitation on the present invention.

In those cases when coherent data processing or storage is required, the optical fiber that delivers the optical power can also be used to deliver light to a fiber optic coupler used to split the light at optical data devices 106a–106n onto a plurality of fibers. The fibers at the output of the coupler can be trimmed in order to match the path length of the two resulting beams of light at the position where they interfere with each other. The resulting matched path lengths render the optical data devices more tolerant to limited coherent lengths possibly provided by laser sources 102a–102n, and are not intended to impose a limitation on the present invention.

Figure 2:
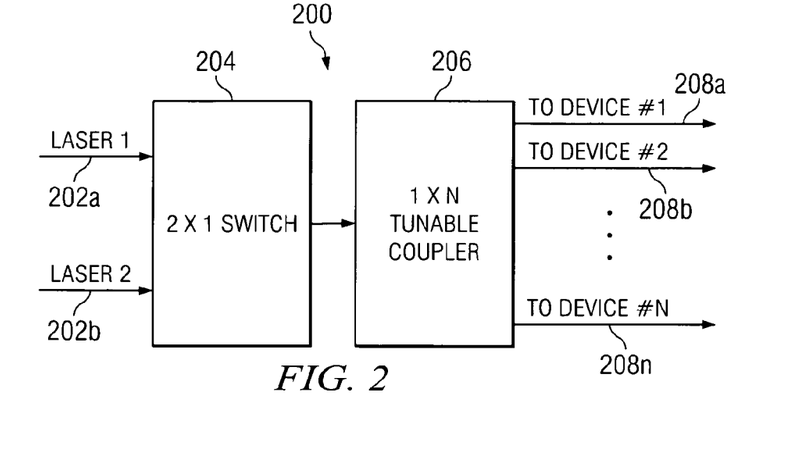
FIG. 2 depicts a pictorial representation of an exemplary optical power switch and tunable coupler module that may be used to illustrate principles of the present invention.

With reference now to FIG. 2, a pictorial representation of an exemplary optical power switch and tunable coupler module is depicted that may be used to illustrate principles of the present invention. For example, optical power switch and tunable coupler module 200 can be used to implement optical power switch and tunable coupler 104 in FIG. 1 with power coupled from only two laser power sources (i.e., laser power sources 102a–102b) via input connections 202a, 202b (i.e., "m" can represent "2" in FIG. 1). For example, 2×1 switch 204 can include at least one fiber optic switch. The fiber optic switch (or switches) can select an input connection 202a or 202b and thus couple the laser energy (power) present at selected connection 202a or 202b to an input of 1×N tunable coupler 206, thus providing fault-tolerance and the possibility to replace a faulty laser without interruption in the delivery of laser power and the associated down-time. Tunable coupler 206 (in combination with switch 204), for example, can use "n−1" 1×2 fiber tunable directional couplers to direct the selected laser power received from switch 204 towards one or more optical data devices at a coupling ratio selected by laser power monitor 108. For example, n−1 TC1400™ series tunable directional couplers (as manufactured by FiberPro) can be used to provide n tunable outputs in a known binary tree configuration. As described in more detail below, for this exemplary embodiment, a laser power monitor (e.g., laser power monitor 108 in FIG. 1) determines the coupling ratio(s) for tunable coupler 206.

Figure 3:
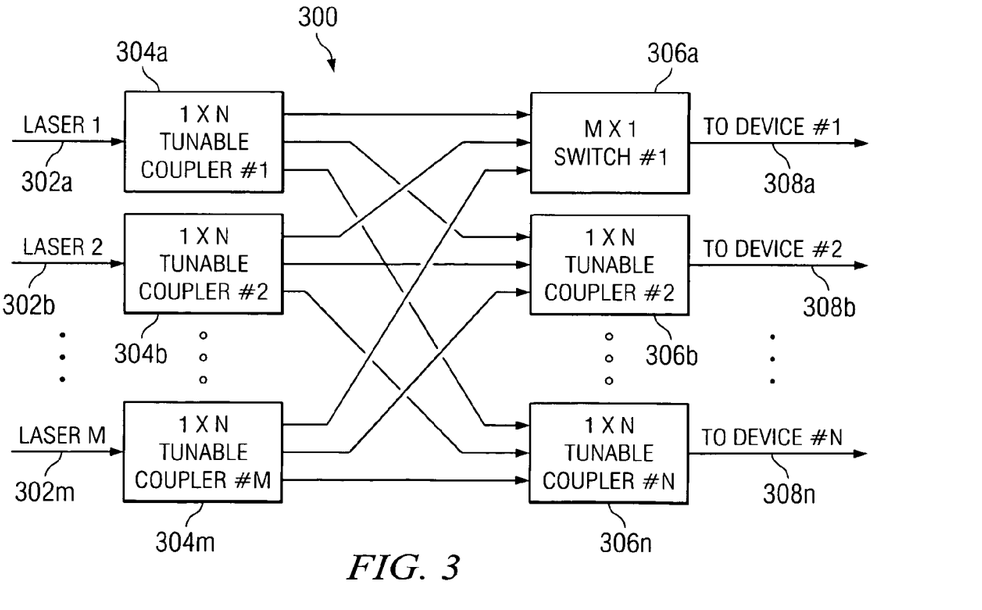
FIG. 3 depicts a pictorial representation of an exemplary generic optical power switch and tunable coupler module that may be used to illustrate principles of the present invention.

With reference now to FIG. 3, a pictorial representation of an exemplary, generic optical power switch and tunable coupler module is depicted that may be used to illustrate principles of the present invention. For example, optical power switch and tunable coupler module 300 can be used to implement optical power switch and tunable coupler 104 in FIG. 1 with power coupled from "m" laser power sources (i.e., laser power sources 102a–102m) via input connections 302a–302m.

Exemplary optical power switch and tunable coupler module 300 includes a plurality of 1×n tunable coupler sections 304a–304m. Each tunable coupler section 304a–304m can use, for example, "n−1" 1×2 fiber tunable directional couplers to direct the selected laser power received towards one or more optical data devices at a coupling ratio selected by a laser power monitor (e.g., laser power monitor 108 in FIG. 1). Again, for example, n−1 FiberPro™ TC1400 series tunable directional couplers can be used to produce n tunable outputs in a known binary tree configuration.

For this example, each m×1 switch 306a–306n can include at least one fiber optic switch. The fiber optic switch (or switches) can select an individual input connection from one of the tunable coupler sections 304a–304m and thus couple the laser energy (power) present to an input of a selected device (e.g., one of optical data devices 106a–106n in FIG. 1) via a respective output connection 308a–308n, without mixing light from different lasers and thus providing fault-tolerance and the possibility to replace a faulty laser without down-time. Again, for this exemplary embodiment, a laser power monitor (e.g., laser power monitor 108 in FIG. 1) can determine the coupling ratio(s) for each tunable coupler section 304a–304m, and which laser(s) to send optical power to each of the optical data devices by controlling switches 306a–306n.

For coherent optical data manipulation applications (e.g., holographic data storage), it is important to prevent the (light) energy from two or more laser sources from being combined. However, in the case where coherent illumination is not required, or when the tunable coupler modules 304a–304m are each capable of producing a tuning range that goes down to a virtually zero output power level (or at least minimal, acceptable leakage) for those optical data devices not being served, the m×1 switches 306a–306n can be replaced with m×1 optical power combiners (e.g., m×1 fiber couplers used as combiners) at a potentially lower cost.

Figure 4:
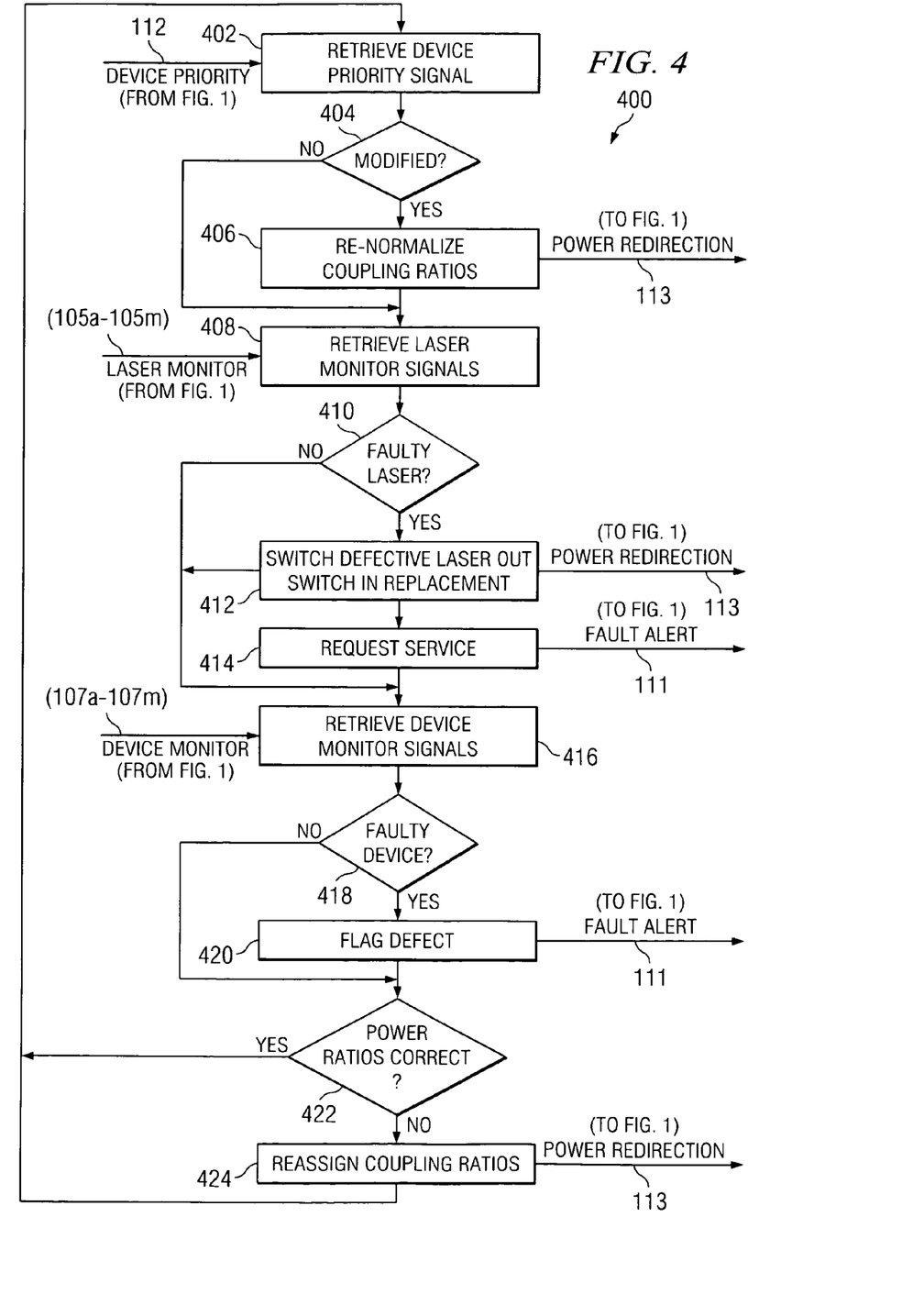
FIG. 4 depicts a flowchart of an exemplary process for an optical power monitor to manage the distribution of power levels for a plurality of data devices, in accordance with a preferred embodiment of the present invention.

With reference now to FIG. 4, a flowchart is depicted of an exemplary process for an optical power monitor to determine a distribution of power levels for a plurality of data devices, in accordance with a preferred embodiment of the present invention. For example, referring also to FIG. 1, process 400 can represent a process for laser power monitor 108 to determine a distribution of power levels from laser power sources 102a–102m to optical data devices 106a–106n. As such, for illustrative purposes only, process 400 is described herein with respect to operations of exemplary fault-tolerant, optical power management system 100 shown in FIG. 1.

Exemplary process 400 begins by laser power monitor 108 retrieving a (device) performance priority signal from data management system controller 110 via connection 112 (step 402). The performance priority signal from data management system controller 110 determines which optical data devices 106a–106n have a higher performance priority, and therefore, should receive more of the available optical power. Typically, all of optical data devices 106a–106n can be given equal priorities, and the total power available from laser power sources 102a–102m can be distributed equally among optical data devices 106a–106n. Additionally, the performance priority signal retrieved from data management system controller 110 can be used as a "flag" to laser power monitor 108 to recognize that an optical data device (e.g., optical data device 106a) is not being used (i.e., zero priority assigned by data management system controller 110). Consequently, laser power monitor 108 can redirect laser power away from that "flagged" optical data device (e.g., optical data device 106a) to one or more of the remaining optical data devices (e.g., optical data devices 106b–106n).

If laser power monitor 108 receives a performance priority signal from data management system controller 110 and determines that a change in the priorities of optical data devices 106a–106n has occurred (step 404), laser power monitor 108 recalculates the normalized coupling ratios for the (e.g., remaining) optical data devices where the priority signal sets the weights of the normalized, weighted coupling ratios (step 406). Laser power monitor 108 can then send an appropriate power redirection signal with the recalculated coupling ratios to optical power switch and tunable coupler 104 via connection 113.

Next, for this exemplary embodiment, laser power monitor 108 retrieves the laser output power monitor signals from each laser power source 102a–102m via power output monitor connections 105a–105m (step 408). Laser power monitor 108 can then determine whether or not a retrieved laser output power monitor signal has a value that is less than or equal to a specified power threshold value (step 410). If so, laser power monitor 108 assumes that the particular laser power source associated with that signal is defective. Laser power monitor 108 can then send a power redirection signal (via connection 113) to optical power switch and tunable coupler 104, in order to switch the defective laser power source out of service, and reapportion the power from the remaining laser power sources to optical data devices 106a–106n (step 412). Also, laser power monitor 108 can send an appropriate flag (e.g., fault alert message) to data management system controller 110 via connection 111, in order to initiate service to replace the defective laser power source (step 414). Additionally, in response to receiving a fault alert message, data management system controller 110 can initiate a process to prevent a more catastrophic system failure, such as, for example, backing up system data, flushing buffers, using alternative optical data devices, etc.

Next, for this exemplary embodiment, laser power monitor 108 retrieves the power monitor signals from optical data devices 106a–106n via respective power monitor output connections 107a–107n (step 416). These signals allow laser power monitor 108 to determine how much power from each laser power source 102a–102m has arrived at a respective optical data device 106a–106n. Additionally, the strengths of these signals can allow laser power monitor 108 to determine the optical losses due to fiber optic connections, switches, and/or couplers involved in those particular laser power flows.

In response to receipt of the power monitor signals from optical data devices 106a–106n, laser power monitor 108 can determine whether or not a particular optical data device 106a–106n has failed (step 418). If so, laser power monitor 108 can send an appropriate fault alert signal (e.g., as a flag) to data management system controller 110 via connection 111 (step 420).

Additionally, the power monitor signals from optical data devices 106a–106n can be used in a closed feedback process to control the coupling ratios of the tunable coupler module(s) of optical power switch and tunable coupler 104, and to compensate for temporal fluctuations in optical power losses in the optical power distribution path. For example, laser power monitor 108 can determine from the power monitor signals received from optical data devices 106a–106n whether or not the coupling ratios being used in the tunable coupler module(s) of optical power switch and tunable coupler 104 are correct, by comparing the power monitor signals received from optical data devices 106a–106n with a predetermined calculation representing correct coupling ratios preferably derived from performance priority signals received from data management system controller 110 via connection 112 (step 422). If laser power monitor 108 determines that one or more of the coupling ratios being used in the tunable coupler module(s) of optical power switch and tunable coupler 104 are incorrect, then laser power monitor 108 can send an appropriate power redirection signal to optical power switch and tunable coupler 104 via connection 113, in order to reassign the coupling ratios (e.g., by incrementally adjusting the coupling ratios by small amounts) until the desired, correct coupling ratios are achieved (step 424). Preferably, these incremental adjustments of the coupling ratios are designed to be small enough to prevent unstable feedback loop behavior, but still large enough to provide a rapid system response (i.e., using control system techniques well-known to those of ordinary skill in the art).

Furthermore, the laser power monitor 108 may keep track of the periods of time, duration, and the power levels at which each of laser sources 102a–102m are used. This information then can be used to keep track of which laser sources are most likely to fail, and preventive maintenance can be requested to data management system controller 110 via connection 111. The preventive maintenance can be in the form of the preventive replacement of the unit, or its preventive servicing (e.g., replacement of a pump diode module). Also, the laser power monitor 108 can use the laser usage information in order to increase the useful life of each laser by using one (or both) of the following techniques: 1) by guaranteeing that each source is used at least once over a certain period of time; and 2) by equalizing the total energy output of each source by using more of those sources that have been used the least, whenever not in conflict with other data management performance priorities.

Figure 5:
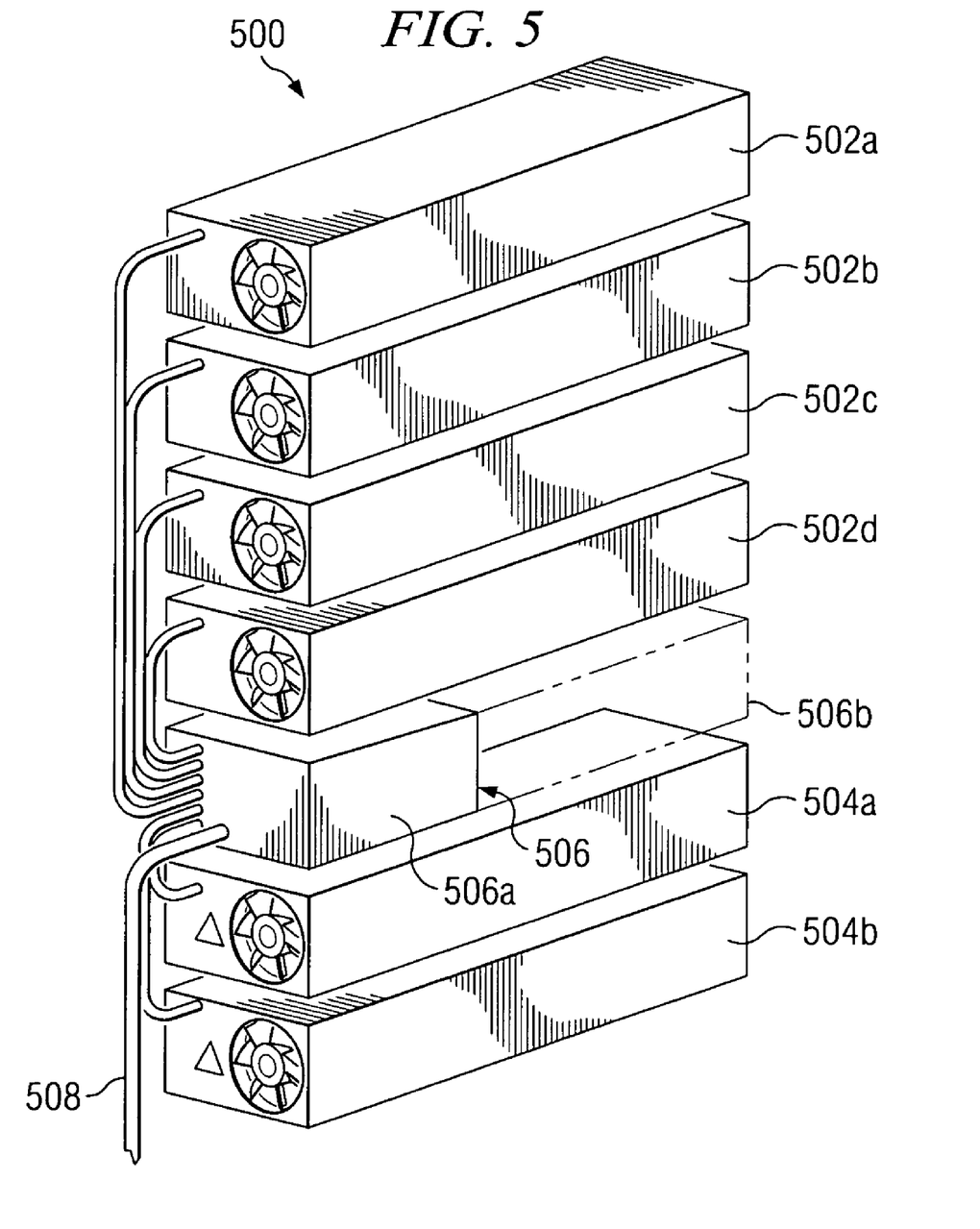
FIG. 5 depicts a pictorial representation of an exemplary equipment rack containing optical data devices, optical power sources, a laser power monitor, and an optical power switch and tunable coupler module, in accordance with a preferred embodiment of the present invention.

With reference now to FIG. 5, a pictorial representation is depicted of an exemplary equipment rack containing optical data devices, optical power sources, a laser power monitor, and an optical power switch and tunable coupler, in accordance with a preferred embodiment of the present invention. For this exemplary embodiment, equipment rack 500 includes a plurality of optical data device modules 502a–502d (e.g., including optical data devices similar in structure and function to optical data devices 106a–106n in FIG. 1), a plurality of optical power source modules 504a–504b (e.g., including optical power sources similar in structure and function to laser power sources 102a–102m), an optical power monitor module 506a (e.g., including an optical power monitor similar in structure and function to laser power monitor 108), and an optical power switch and tunable coupler module 506b (e.g., including an optical power switch and tunable coupler similar in structure and function to optical power switch and tunable coupler 104). An optical power monitor module 506a and a tunable coupler module 506b can be packaged together in a single module 506 (as shown in FIG. 5), or they can be packaged in separate modules in an alternative embodiment.

Advantageously, as shown, modules 502a–502d, 504a–504b and 506a–506b are mounted in the same equipment rack, with the respective outputs and inputs of modules 502a–502d, 504a–504b and 506a coupled together via module 506b with appropriate optical coupling (e.g., optical fiber coupling). Also, advantageously, modules 502a–502d, 504a–504b and 506a–506b use similar form-factors in order, for example, to facilitate the field replacement of defective units, the upgrade of existing equipment, and the inclusion of additional equipment (e.g., more laser sources, new optical data devices, etc.). As such, a plurality of these modules can be available in order to provide the system with the redundancy required for superior fault-tolerance.

Additionally, for a preferred embodiment, the optical fibers conveying optical power between the modules shown in FIG. 5, the conducting wires conveying electronic signals (e.g., 105a–105m and 107a–107n), and the conducting wires conveying electrical power to these modules can be bundled together in one cable, which simplifies the cabling and facilitates replacement of the modules during repairs or upgrades.

Furthermore, a bundle of optical cables and/or electronic signal wires and/or electrical power cable 508 can be used to interconnect equipment rack 500 to other equipment racks in a data management system.

Figure 6:
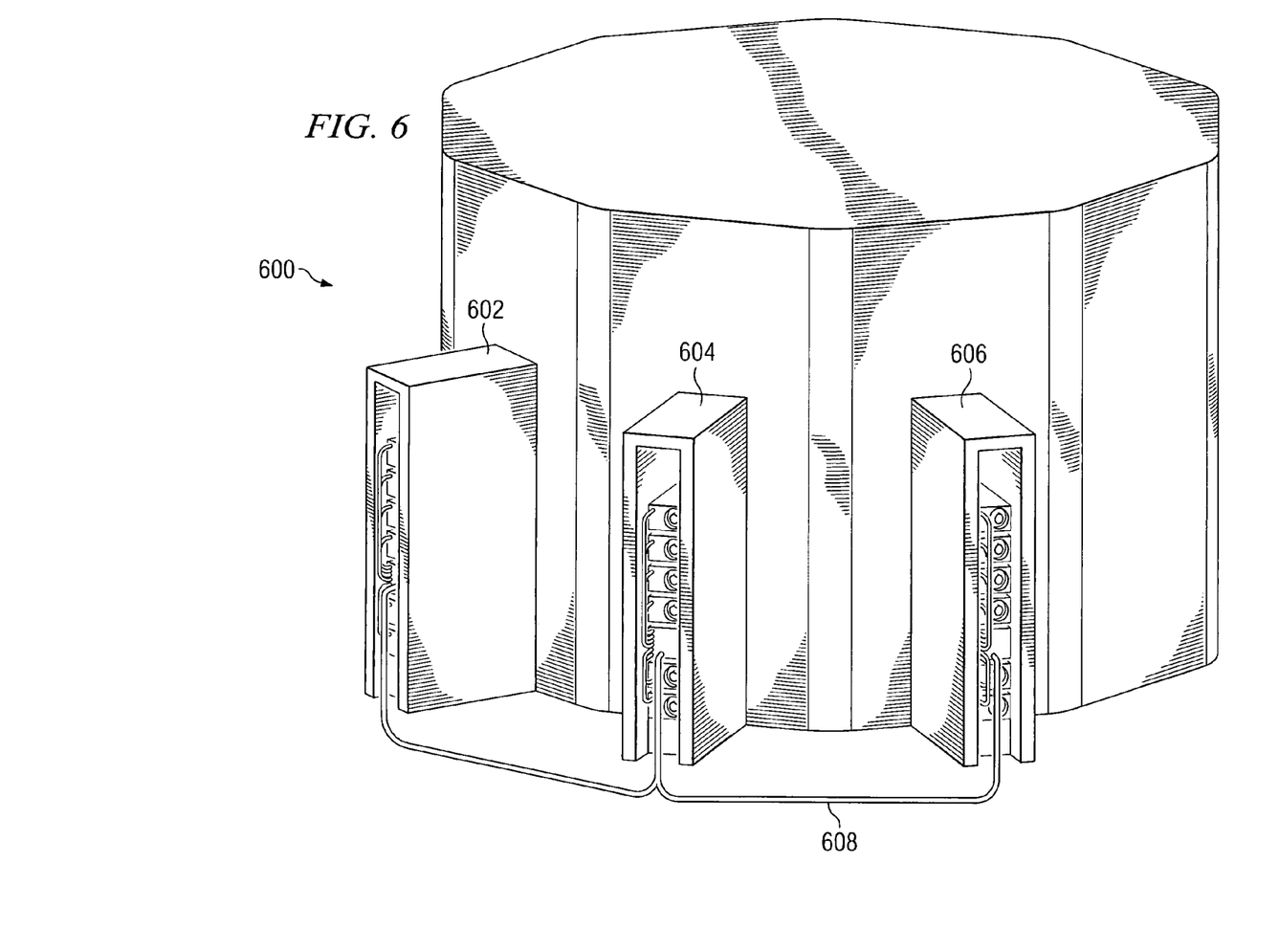
FIG. 6 depicts a pictorial representation of an exemplary data management system containing multiple interconnected racks similar to the exemplary equipment rack depicted in FIG. 5.

With reference now to FIG. 6, a pictorial representation is depicted of an exemplary data management system containing multiple interconnected racks, which are similar to the exemplary equipment rack depicted in FIG. 5. For example, exemplary data management system 600 contains a plurality of equipment racks 602, 604, 606. However, it should be understood that although only three equipment racks are shown in FIG. 6, the present invention is not intended to be so limited, and data management system 600 can contain a number of additional equipment racks similar in structure and function to racks 602, 604 and 606. Preferably, each of racks 602, 604, 606 is arranged with modules similar in structure and function to modules 502a–502d, 504a–504b and 506a–506b in FIG. 5, and coupled together (e.g., via modules similar to module 506a in FIG. 5), using optical cable 608 similar to cable 508, for conveying optical power between the respective outputs and inputs of the modules with appropriate optical coupling. Alternatively, for example, one or more of the modules (e.g., modules 502a–502d and 504a–504b) contained in each rack 602, 604, 606 can be arbitrarily mounted on a different one of racks 602, 604, 606, with their respective outputs and inputs coupled together (e.g., via a module such as module 506b in FIG. 5) with appropriate optical coupling.

It is important to note that while the present invention has been described in the context of a fully functioning fault-tolerant, optical power management apparatus and method for automated data manipulation and storage, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for distributing optical power to a plurality of optical data devices, the method comprising the steps of:

retrieving a priority signal, said priority signal associated with a priority ranking for said plurality of optical data devices;

determining if said priority signal indicates a change in said priority ranking for said plurality of optical data devices; and responsive to a determination that the priority signal indicates the change in the priority ranking for the plurality of optical data devices, redistributing said optical power to said plurality of optical data devices.

2. The method of claim 1, further comprising the steps of:

retrieving a plurality of optical power monitor signals, said plurality of optical power monitor signals associated with a plurality of power levels of a plurality of optical power sources;

determining if said plurality of optical power output monitor signals indicates a defect in at least one optical power source of said plurality of optical power sources; and responsive to a determination that the plurality of optical power output monitor signals indicates the defect in the at least one optical power source, redistributing said optical power to said plurality of optical data devices.

3. The method of claim 2, further comprising the step of sending a flag to a management unit, said flag indicating at least one of said defect and a request to correct said defect.

4. The method of claim 2, further comprising the step of redistributing said optical power to said plurality of optical data devices without incurring system down time.

5. The method of claim 3, further comprising the step of field replacement of said at least one defective optical power source without system down time.

6. The method of claim 1, further comprising the steps of:
retrieving a plurality of optical power monitor signals, said plurality of optical power monitor signals associated with a plurality of optical power levels received at a plurality of optical data devices;
determining if said plurality of optical power output monitor signals indicates a defect associated with an optical power distribution to at least one optical data device of said plurality of optical data devices; and
responsive a determination that the plurality of optical power output monitor signals indicates the defect associated with the optical power distribution to the at least optical data device, redistributing said optical power to said plurality of optical data devices.

7. The method of claim 6, further comprising the step of sending a flag to a management unit, said flag indicating said defect, and a request to correct said defect.

8. The method of claim 7, further comprising the step of field replacement of said defect associated with said optical power distribution without system down time.

9. The method of claim 1, further comprising the steps of:
retrieving a plurality of power monitor signals from said plurality of optical data devices;
determining if said plurality of power monitor signals from said plurality of optical data devices indicates a difference in a first power coupling ratio associated with a distribution of said optical power to said plurality of optical data devices; and
responsive to a determination that the plurality of power monitor signals from the plurality of optical data devices indicates the difference in the first power coupling ratio, calculating a second power coupling ratio associated with said distribution of said optical power to said plurality of optical data devices.

10. The method of claim 1, wherein said optical power comprises laser power.

11. The method of claim 10, wherein said laser power comprises power derived from a CW laser or a pulsed laser.

12. The method of claim 1, wherein the plurality of data devices comprise a plurality of optical data management or storage devices.

13. The method of claim 1, wherein the redistributing step is performed by an optical power switch and tunable coupler.

14. The method of claim 1, wherein the redistributing step is performed by an optical power combiner unit and a tunable optical power coupler unit.

15. The method of claim 9, wherein said first power coupling ratio comprises a plurality of power coupling ratios.

* * * * *